United States Patent
Uetake et al.

(10) Patent No.: US 6,952,625 B2
(45) Date of Patent: Oct. 4, 2005

(54) RECYCLING JOB SUPPORTING SYSTEM, RECYCLING CENTER EQUIPMENT, INFORMATION MANAGEMENT CENTER EQUIPMENT, EQUIPMENT PROGRAM, AND RECYCLING JOB SUPPORTING METHOD

(75) Inventors: Akihito Uetake, Hachioji (JP); Yoshiki Fukui, Suwa (JP); Mitsugu Igura, Tokyo (JP); Haruhiko Baba, Matsudo (JP); Takeshi Ishikawa, Nagano (JP)

(73) Assignee: Seiko Epson Corporation (JP)

( * ) Notice: Subject to any disclaimer, the term of this patent is extended or adjusted under 35 U.S.C. 154(b) by 29 days.

(21) Appl. No.: 10/686,030

(22) Filed: Oct. 15, 2003

(65) Prior Publication Data

US 2004/0143355 A1 Jul. 22, 2004

(30) Foreign Application Priority Data

Nov. 14, 2002 (JP) .................................... 2002-331172

(51) Int. Cl.[7] .............................................. G06F 19/00
(52) U.S. Cl. ......................................... 700/116; 700/97
(58) Field of Search .............................. 700/95, 97, 116, 700/213; 705/1, 29; 707/104.1; 29/426.1

(56) References Cited

U.S. PATENT DOCUMENTS

| | | | | |
|---|---|---|---|---|
| 6,226,617 B1 | * | 5/2001 | Suzuki et al. ................... | 705/1 |
| 6,633,795 B1 | * | 10/2003 | Suzuki et al. ................ | 700/213 |
| 6,725,184 B1 | * | 4/2004 | Gadh et al. ...................... | 703/2 |
| 2003/0097195 A1 | * | 5/2003 | Yamrom et al. ............... | 700/95 |

FOREIGN PATENT DOCUMENTS

| | | |
|---|---|---|
| JP | 06-168253 | 6/1994 |
| JP | 06-168254 | 6/1994 |
| JP | 06-246256 | 9/1994 |
| JP | 09-141242 | 6/1997 |
| JP | 11-212471 | 8/1999 |
| JP | 2000-301129 | 10/2000 |
| JP | 2002-197147 | 7/2002 |

* cited by examiner

*Primary Examiner*—Leo Picard
*Assistant Examiner*—Alexander Kosowski
(74) *Attorney, Agent, or Firm*—Harness, Dickey & Pierce, P.L.C.

(57) ABSTRACT

A recycling job supporting system is provided which is capable of efficiently carrying out a disassembly job. Information management center equipment 100 has an object disassembly information register DB 40 in which the object disassembly information is registered by associating the object disassembly information with object identification information, retrieves the object disassembly information from the object disassembly information register DB 40 based on the received object identification information when receiving the object identification information, and transmits the object disassembly information found through the retrieval to recycling center equipment 200. The recycling center equipment 200 reads out the object identification information from the recycling object 70, transmits the read-out object identification information to the information management center equipment 100, constructs any one of a plurality of disassembly diagrams capable of being constructed through the received object disassembly information depending on a progress condition of the disassembly job of the recycling object 70 when receiving the object disassembly information through the transmission, and then displays the constructed disassembly diagram in a display unit 68.

11 Claims, 11 Drawing Sheets

RECYCLING JOB SUPPORTING SYSTEM, RECYCLING CENTER EQUIPMENT, INFORMATION MANAGEMENT CENTER EQUIPMENT, EQUIPMENT PROGRAM, AND RECYCLING JOB SUPPORTING METHOD

BACKGROUND OF THE INVENTION

1. Technical Field of the Invention

The present invention relates to systems, equipment, programs, and a method for supporting a disassembling job of recycling objects such as office automation products or home electronics. More specifically, the invention relates to a recycling job supporting system, recycling center equipment, information management center equipment, a program for the equipment, and a recycling job supporting method capable of efficiently performing the disassembly job.

2. Description of the Related Art

Conventionally, a technology for supporting a disassembling job of recycling objects such as office automation products or home electronics includes, for example, a recycling method disclosed in Patent Document 1.

This recycling method is a method of recycling components or materials of the recycling objects and is performed through the following processes (a) to (g).

(a) The recycling objects generated in a designated area are carried and accumulated in a designated recovery point.

(b) The designated recovery point has an input unit for reading out a first product information added to the recycling object and a storage unit for storing a disassembly information database (hereinafter, abbreviated as "DB") for information for comparing, disassembling, and classifying the recycling object corresponding to the first product information added to the recycling object. Additionally, the designated recovery point compares the recycling object corresponding to the disassembly information DB with the first product information of the recycling object obtained from the input unit in the designated recovery point.

(c) The recycling objects are classified into a plurality of first classes based on the comparison of the first product information of the recycling object with the disassembly information DB; and, such classification information of the recycling object is stored in the disassembly information DB as a second product information.

(d) The designated recovery point has a display unit for recognizing a disassembly processing packing member information and a non-disassembly processing member information of the recycling objects based on the first product information or the disassembly information DB of each of the recycling objects classified into the plurality of first classes, and displaying the result of recognition. Additionally, the display unit stores the disassembly processing packing member information and the non-disassembly processing member information in the disassembly information DB.

(e) The recycling objects are disassembled into the disassembly processing packing members and the non-disassembly processing members based on the result displayed by the display unit; and, the disassembly processing packing members are classified into a plurality of second classes.

(f) Among the disassembly processing packing members and the non-disassembly processing members classified into the plurality of second classes the disassembly processing packing members are carried to and accumulated in each of the material manufacturers. Additionally, the non-disassembly processing members are carried and accumulated in each of the product manufacturers.

(g) The accumulated disassembly processing packing members are processed into recycled materials using a process method based on the disassembly information DB and the information of the recycled materials is stored in the disassembly information DB.

On the other hand, the designated recovery points, the material manufacturers and the product manufacturers share the disassembly information DB through a network.

In the aforementioned conventional recycling method, the recycling objects are disassembled into the disassembly processing packing members and the non-disassembly processing members based on the result displayed in the display unit. Specifically, first, the disassembly information is displayed in the display unit; and, packing members and the casing portions of the recycling object are disassembled based on the displayed disassembly information. In this regard, the disassembly information includes a disassembly information of the packing members and the casing portions of the recycling objects and recycling information and reusable information of the packing members and the casing portions. Such information includes at least materials of the packing members and the casing portions, names of manufactures of the materials of the packing members and the casing portions, names of manufactures of the recycling objects of the packing members and the casing portions, names of the packing members and the casing portions, and numbers of the packing members and the casing portions.

However, there is a problem in that it is difficult for a disassembly operator to find out how to disassemble the recycling objects only by using such disassembly information.

Further, although it is preferable that the disassembly operator find out a proper order corresponding to the progress condition of the disassembly job in order to efficiently proceed the disassembly job, sufficient experience is required for the disassembly operator and when the types of the recycling objects are vast, an expert is confronted with a restriction to find out the orders. Furthermore, proceeding the disassembly job by consulting a manual, etc. and indicating the disassembly order for every recycling object may be considered. However, if the types of the recycling objects are vast, it takes time to consult the manual, etc. and it is restrictive to efficiently proceed the disassembly job. Furthermore, when the disassembly process is complicated, the manual, etc. must be consulted, and thus the same problems occur.

Therefore, the present invention is made in view of the unsolved problems of the conventional art. Thus, it is an object of the present invention to provide a recycling job supporting system, recycling center equipment, information management center equipment, a program for the equipment, and a recycling job supporting method capable of efficiently performing the disassembly job.

SUMMARY

First Embodiment

In order to accomplish the above object, a recycling job supporting system according to a first embodiment is a system for supporting a disassembling job of a recycling object to be recycled, the system comprising: object identification information input means for inputting object identification information for identifying the recycling object.

Moreover, object disassembly information storage means for storing the object disassembly information for constructing a plurality of different disassembly diagrams during a process of disassembling the recycling object by associating the object disassembly information with the object identification information. Furthermore, the object disassembly information retrieving means for retrieving the object disassembly information from the object disassembly information storage means based on the object identification information input by the object identification information input means. Additionally, the disassembly diagram constructing means for constructing the disassembly diagrams based on the object disassembly information found by the object disassembly information retrieving means; and disassembly diagram output means for outputting the disassembly diagrams constructed by the disassembly diagram constructing means, wherein the disassembly diagram constructing means constructs any one of the plurality of disassembly diagrams which can be constructed through the object disassembly information found by the object disassembly information retrieving means depending on a progress condition of the disassembly job of the recycling object.

According to the above construction, when disassembling the recycling object, first, the object identification information for identifying the recycling object is input by the object identification information input means. When the object identification information is input by the object identification information input means, the object disassembly information is retrieved from the object disassembly information storage means by the object disassembly information retrieving means based on the input object identification information. As a result, when the relevant object disassembly information is found, any one of the plurality of disassembly diagrams which can be constructed through the found object disassembly information is constructed depending on the progress condition of the disassembly job of the recycling object by the disassembly diagram constructing means, then the constructed disassembly diagram is output by the disassembly diagram output means.

A disassembly operator can proceed the disassembly job with reference to the output disassembly diagram. Further, since the disassembly diagrams are sequentially output depending on the progress condition of the disassembly job, an effort or time is not required as much in referring to the next disassembly diagram.

Accordingly, since the disassembly operator can find out the specific disassembly orders for how to disassemble the recycling object from the disassembly diagrams and can understand the relatively-proper orders depending on the progress condition of the disassembly job without exerting an effort or time, it is possible to perform the disassembly job more efficiently compared with conventional art.

Herein, the disassembly diagram means a diagram or a sentence which explains a job order in which the job proceeds from one process to a next process in disassembling the recycling object.

Hereinafter, the same is true for a recycling job supporting system according to a second embodiment, recycling center equipment according to a ninth embodiment, a program for equipment according to an eleventh embodiment, and a recycling job supporting method according to a thirteenth embodiment.

Further, the disassembly diagram output means may be constructed to output the disassembly diagrams using displays, prints, or methods in which perception is possible by means of five senses and may be constructed to output the disassembly diagram as data.

Furthermore, the object disassembly information is information for constructing a plurality of different disassembly diagrams, all of the disassembly diagrams may be constructed with drawings, or all of the disassembly diagrams may be constructed with sentences, or each of the disassembly diagrams may be constructed with any one of drawings and sentences or in combination of them. Now, the same is true for a recycling job supporting system according to the second embodiment, recycling center equipment according to the ninth embodiment, information management center equipment according to a tenth embodiment, a program for equipment according to the eleventh embodiment, and a twelfth embodiment, and a recycling job supporting method according to the thirteenth embodiment.

Furthermore, the object disassembly information storage means is for storing the object disassembly information with all means and at all times, may store the object disassembly information in advance, and may store the object disassembly information through the external input during operation of the system, without storing the object disassembly information in advance.

Hereinafter, the same is true for the recycling job supporting system according to the second embodiment.

Second Embodiment

Furthermore, the recycling job supporting system according to the second embodiment is a system for supporting the disassembling job of the recycling object in the recycling center, and communicably connecting recycling center equipment provided in the recycling center for disassembling the recycling object to be recycled and an information management center equipment provided in an information management center for managing information for supporting the recycling job to each other. The recycling center equipment comprises an object identification information read-out means for reading out object identification information for identifying the recycling object from the recycling object. Additionally, the recycle center equipment object to a identification information transmitting means for transmitting the object identification information read out by the object identification information read-out means to the information management center equipment, object disassembly information receiving means for receiving the object disassembly information for constructing a plurality of different disassembly diagrams during a process of disassembling the recycling object, the disassembly diagram constructing means for constructing the disassembly diagrams based on the object disassembly information received by the object disassembly information receiving means; and the disassembly diagram display means for displaying the disassembly diagrams constructed by the disassembly diagram constructing means.

The information management center equipment comprising: the object disassembly information storage means for storing the object disassembly information by associating the object disassembly information with the object identification information, the object identification information receiving means for receiving the object identification information; the object disassembly information retrieving means for retrieving the object disassembly information from the object disassembly information storage means based on the object identification information received by the object identification information receiving means; and, the object disassembly information transmitting means for transmitting the object disassembly information found by the object disassembly information retrieving means to the recycling center equipment, wherein the disassembly diagram constructing means constructs any one of the plurality of disassembly diagrams which can be constructed through the object disassembly information received by the object disassembly information receiving means depending on a progress condition of the disassembly job of the recycling object.

According to the above construction, when the recycling object is disassembled, in the recycling center equipment, the object identification information for identifying the recycling object is read out from the recycling object by the object identification information read-out means, then the read-out object identification information is transmitted to the information management center equipment by the object identification information transmitting means.

In the information management center equipment, when the object identification information is received by the object identification information receiving means, the object disassembly information is retrieved from the object disassembly information storage means based on the received object identification information by the object disassembly information retrieving means. As a result, when the relevant object disassembly information is found, a found object disassembly information is transmitted to the recycling center equipment by the object disassembly information transmitting means.

In the recycling center equipment, when the object disassembly information is received by the object disassembly information receiving means, any one of the plurality of disassembly diagrams which can be constructed through the received object disassembly information is constructed depending on the progress condition of the disassembly job of the recycling object, by the disassembly diagram constructing means, then the constructed disassembly diagram is displayed by the disassembly diagram output means.

A disassembly operator can proceed the disassembly job with reference to the displayed disassembly diagram. Further, since the disassembly diagrams are sequentially displayed depending on the progress condition of the disassembly job, an effort or time is not required as much in referring to the next disassembly diagram.

Accordingly, since the disassembly operator can find the specific disassembly orders for how to disassemble the recycling object from the disassembly diagram and can understand the relatively-proper orders depending on the progress condition of the disassembly job without exerting an effort or time, it is possible to perform the disassembly job more efficiently compared with the conventional art.

Herein, the recycling center equipment may be constructed with a single apparatus, terminal, or other equipment and may be constructed with a plurality of apparatuses, terminals, or other equipments communicably connected to each other. The same is true for the information management center equipment.

Third Embodiment

Furthermore, the recycling job supporting system according to a third embodiment is the recycling job supporting system according to the second embodiment, wherein the recycling center equipment further comprises external image taking means for taking an external image of the recycling object, wherein, the disassembly diagram constructing means determines the progress condition of the disassembly job of the recycling object based on the external image taken by the external image taking means and depending on the progress condition determined by the disassembly diagram constructing means, constructs any one of the plurality of disassembly diagrams which can be constructed through the object disassembly information received by the object disassembly information receiving means.

According to the above construction, as the disassembly operator proceeds a disassembly job, an external image of the recycling object under disassembly is taken by the external image taking means in the recycling center equipment. In addition, by the disassembly diagram constructing means, the progress condition of the disassembly job of the recycling object is determined by a taken-in external image and any one of the plurality of disassembly diagrams which can be constructed through the received object disassembly information is constructed depending on a progress condition determined by the disassembly diagram constructing means.

Accordingly, since the progress condition of the disassembly job is determined from the external image of the recycling object, the disassembly operator can find out more proper order depending on the progress condition of the disassembly job. In addition, the disassembly operator does not have to specially instruct the progressing conditions during the disassembly job. Therefore, it is possible to perform the disassembly job more efficiently.

Fourth Embodiment

Furthermore, the recycling job supporting system according to the fourth embodiment is a recycling job supporting system according to the third embodiment, wherein the object disassembly information is an information for constructing a disassembly diagram of explaining a job order in which the job proceeds to a next sub process with respect to a relevant sub process for every sub process when the disassembly job is divided into sub processes, wherein the information management center equipment further comprises process management information storage means for storing an process management information comprising association of the external image of the recycling object with the object disassembly information for every sub process, wherein the object disassembly information transmitting means reads out the process management information corresponding to the object disassembly information found by the object disassembly information retrieving means from the process management information storage means, and transmits the found object disassembly information and the read-out process management information to the recycling center equipment, wherein the object disassembly information receiving means receives the object disassembly information and the process management information, wherein the disassembly diagram constructing means compares the external image taken by the external image taking means with each of the external images included in the process management information received by the object disassembly information receiving means, specifies an external image equal or similar to the external image taken by the external image taking means from each of the external images, and constructs a disassembly diagram corresponding to the specified external image among the plurality of disassembly diagrams which can be constructed through the object disassembly information received by the object disassembly information receiving means.

According to the above construction, in the information management center equipment, the process management information corresponding to the found object disassembly information is read out from the process management information storage means and the found object disassembly information and the read-out process management information are transmitted to the recycling center equipment by the object disassembly information transmitting means.

In the recycling center equipment, when the object disassembly information and the process management information are received by the object disassembly information receiving means, the taken-in external image is compared with each of the external images included in the received process management information and an external image equal or similar to the taken-in external image is specified from each of the external images by the disassembly diagram constructing means. Next, the disassembly diagram corresponding to the specified external image is constructed among the plurality of disassembly diagrams which can be constructed by the received object disassembly information.

Accordingly, since the disassembly diagram corresponding to the external image of the recycling object is constructed, the disassembly operator can find out a more proper order depending on the progress condition of the disassembly job. Therefore, it is possible to perform the disassembly job more efficiently.

Fifth Embodiment

Furthermore, the recycling job supporting system according to the fifth embodiment is a recycling job supporting system according to the fourth embodiment, wherein the recycling center equipment further comprises a pair of glasses, wherein one of lenses of the glasses is provided with the disassembly diagram display means such that an operator wearing the glasses can view the disassembly diagram displayed in the disassembly diagram display means, and wherein a frame of the glasses is provided with the external image taking means such that the operator wearing the glasses can take the external image of the recycling object in while viewing the recycling object.

According to the above construction, in the recycling center equipment, since the one of lenses of the glasses is provided with the disassembly diagram display means, the disassembly operator wearing the glasses can view the disassembly diagram displayed in the disassembly diagram display means. In addition, since the frame of the glasses is provided with the external image taking means, when the disassembly operator views the recycling object wearing the glasses, the external image of the recycling object is taken in by the external image taking means.

Accordingly, since the disassembly operator can proceed the disassembly job while viewing the disassembly diagram through the glasses, effort or time is less required in referring to the disassembly diagram. In addition, since the external image of the recycling object can be taken in from a point of view of the disassembly operator and thus the progress condition of the disassembly job can be relatively found accurately, a more proper order can be found depending on the progress condition of the disassembly job. Therefore, it is possible to perform the disassembly job more efficiently.

Sixth Embodiment

Furthermore, the recycling job supporting system according to the sixth embodiment is a recycling job supporting system according to any one of the second to fifth embodiments, wherein the disassembly diagram constructing means constructs the disassembly diagrams to be a front view of the recycling object when seen from the disassembly operator.

According to the above construction, in the recycling center equipment, the disassembly diagram is constructed to be the front view when seen from the disassembly operator.

Accordingly, since a front view when seen from the disassembly operator of the disassembly diagram is displayed, the disassembly operator can easily find out a specific disassembly order for how to disassemble the recycling object. Therefore, it is possible to perform the disassembly job more efficiently.

Seventh Embodiment

Furthermore, the recycling job supporting system according to thea seventh embodiment is the recycling job supporting system according to any one of the second to sixth embodiments, wherein the disassembly diagrams include instructions for classifying materials of components constituting the recycling object.

According to the above construction, in the disassembly diagram display means, the disassembly diagram including the explanation for classifying materials of components constituting the recycling object is displayed.

Accordingly, since the disassembly operator can classify the components constituting the recycling object by referring to the displayed explanation, the classification job is facilitated. Therefore, it is possible to efficiently perform the classification job compared with the conventional art.

Herein, the explanation for classifying the materials includes an explanation using drawings in addition to the explanation using sentences. From the point of view of facilitating making reference to the explanation, the explanation using drawings is more preferable because it can be understood visually.

Eighth Embodiment

Furthermore, the recycling job supporting system according to an eighth embodiment is a recycling job supporting system according to any one of the second to seventh embodiments, wherein the disassembly diagrams include instructions for indicating positions of screws for coupling components constituting the recycling object.

According to the above construction, in the disassembly diagram display means, the disassembly diagram including the explanation for indicating the positions of the screws for coupling the components constituting the recycling object is displayed.

Accordingly, since the disassembly operator can find positions of the screws for coupling components constituting the recycling object by referring to a displayed explanation, the disassembly job is facilitated. Therefore, it is possible to perform the disassembly job more efficiently.

Herein, an explanation for indicating the positions of screws includes the explanation using drawings in addition to the explanation using sentences. From the point of view of facilitating making reference to the explanation, the explanation using drawings is more preferable because it can be understood visually.

Ninth Embodiment

On the other hand, in order to accomplish the above object, recycling center equipment according to the ninth embodiment, is the recycling center equipment communicably connected to the information management center equipment in the recycling job supporting system according to the second embodiment, comprising: the object identification information read-out means for reading out object identification information for identifying the recycling object from the recycling object, the object identification information transmitting means for transmitting the object identification information read out by the object identification information read-out means to the information management center equipment, the object disassembly information receiving means for receiving object disassembly information for constructing a plurality of different disassembly diagrams during a process of disassembling the recycling object; disassembly diagram constructing means for constructing the disassembly diagrams based on the object disassembly information received by the object disassembly information receiving means; and, the disassembly diagram display means for displaying the disassembly diagrams constructed by the disassembly diagram constructing means, wherein the disassembly diagram constructing means constructs any one of the plurality of disassembly diagrams which can be constructed through the object disassembly information received by the object disassembly information receiving means depending on a progress condition of the disassembly job of the recycling object.

According to the above construction, operations equal to that of the recycling center equipment in the recycling job supporting system of the second embodiment are obtained. Therefore, advantages equal to the recycling job supporting system of the second embodiment are obtained.

Tenth Embodiment

On the other hand, in order to accomplish the aforementioned object, information management center equipment according to a tenth embodiment is the information management center equipment communicably connected to the recycling center equipment in the recycling job supporting system according to the second embodiment, comprising: the object disassembly information storage means for storing object disassembly information by associating the object disassembly information with object identification information, the object identification information receiving means for receiving the object identification information, the object disassembly information retrieving means for retrieving the object disassembly information from the object disassembly information storage means based on the object identification information received by the object identification information receiving means, and the object disassembly information transmitting means for transmitting the object disassembly information found by the object disassembly information retrieving means to the recycling center equipment.

According to the above construction, operations equal to that of the information management center equipment in the recycling job supporting system according to the second embodiment are obtained. Therefore, advantages equal to the recycling job supporting system of the second embodiment are obtained.

Eleventh Embodiment

On the other hand, in order to accomplish the aforementioned object, a program for equipment according to the eleventh embodiment is the program for equipment executed in the recycling center equipment according to the ninth embodiment, the recycling center equipment comprising a computer system, the program executing processes implemented by: the object identification information read-out means for reading out object identification information for identifying recycling object from the recycling object, the object identification information transmitting means for transmitting the object identification information read out by the object identification information read-out means to information management center equipment, the object disassembly information receiving means for receiving object disassembly information for constructing a plurality of different disassembly diagrams during a process of disassembling the recycling object, the disassembly diagram constructing means for constructing the disassembly diagrams based on the object disassembly information received by the object disassembly information receiving means, and the disassembly diagram display means for displaying the disassembly diagrams constructed by the disassembly diagram constructing means, wherein the disassembly diagram constructing means constructs any one of the plurality of disassembly diagrams which can be constructed through the object disassembly information received by the object disassembly information receiving means depending on the progress condition of the disassembly job of the recycling object.

According to the above construction, the program is read out by the recycling center equipment, and when the recycling center equipment performs the process in accordance with the read-out program, operations and advantages equal to the recycling center equipment according to the ninth embodiment are obtained.

Twelfth Embodiment

Furthermore, a program for equipment according to the twelfth embodiment is the program for equipment executed in the information management center equipment according to the tenth embodiment, the information management center equipment comprising a computer system, the program executing processes implemented by: the object identification information receiving means for receiving object identification information the object disassembly information retrieving means for retrieving object disassembly information based on the object identification information received by the object identification information receiving means from the object disassembly information storage means for storing the object disassembly information by associating the object disassembly information with the object identification information, and the object disassembly information transmitting means for transmitting the object disassembly information found by the object disassembly information retrieving means to the recycling center equipment.

According to the above construction, the program is read out by the information management center equipment and when the information management center equipment performs the process in accordance with the read-out program, operations and advantages equal to the information management center equipment according to the tenth embodiment are obtained.

Thirteenth Embodiment

On the other hand, in order to accomplish the aforementioned object, the recycling job supporting method according to the thirteenth embodiment is the recycle job supporting method for supporting the disassembling job of the recycling object to be recycled, comprising: the object identification information input step of inputting object identification information for identifying the recycling objects the object disassembly information retrieving step of retrieving object disassembly information based on the object identification information input in the object identification information input step from the object disassembly information storage means for storing the object disassembly information for constructing a plurality of different disassembly diagrams during a process of disassembling the recycling object in correspondence to the object identification information, a disassembly diagram constructing step of constructing the disassembly diagrams based on the object disassembly information found from the object disassembly information retrieving step, and a disassembly diagram output step of outputting the disassembly diagrams constructed in the disassembly diagram constructing means wherein the disassembly diagram constructing step constructs any one of the plurality of disassembly diagrams which can be constructed through the object disassembly information found from the object disassembly information retrieving step depending on a progress condition of the disassembly job of the recycling object.

According to the above construction, the same advantages as those of the recycling job supporting system of the first embodiment are obtained.

Herein, in the disassembly diagram output step, the disassembly diagram may be output using displays, prints, or methods in which perception is possible by means of five senses, and may be output as data.

DETAILED DESCRIPTION

Now, embodiments of the present invention will be described with reference to the drawings. FIGS. 1 to 11 are views illustrating embodiments of a recycling job supporting system, recycling center equipment, information management center equipment, a program for the equipments, and a recycling job supporting method according to the present invention.

Figure 1:
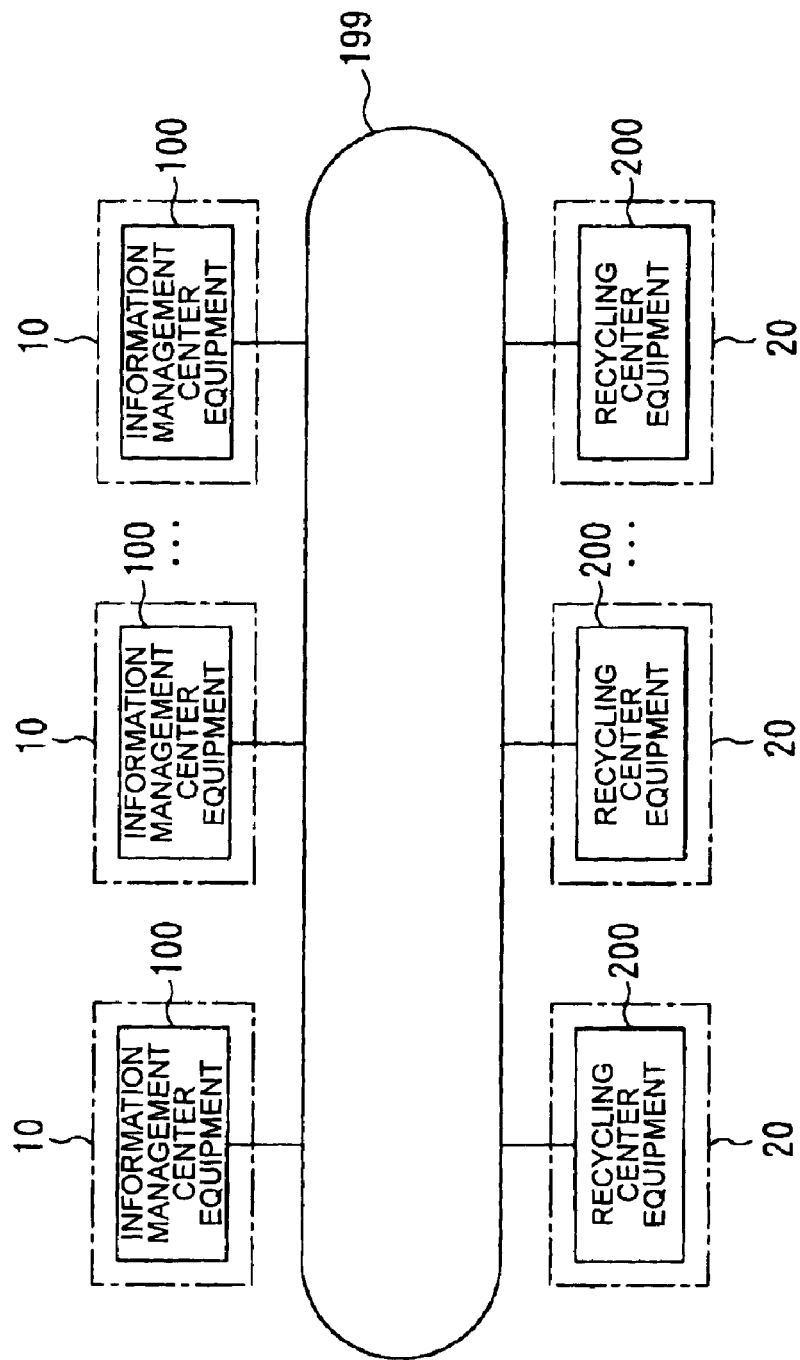
FIG. 1 is a block diagram illustrating a construction of a network system to which the present invention is applied.

In these embodiments, the recycling job supporting system, the recycling center equipment, the information management center equipment, the program for the equipment, and the recycling job supporting method according to the present invention are applied to disassembling and classifying the recycling objects such as office automation products or home electronics in recycling centers 20 as shown in FIG. 1. First, a construction of a network system to which the present invention is applied will be described with reference to FIG. 1. FIG. 1 is a block diagram illustrating the construction of the network system to which the present invention is applied. In FIG. 1, a plurality of information management centers 10 and a plurality of recycling centers 20 are provided every part. Each of the information management centers 10 is provided with information management center equipment 100, and each of the recycling centers 20 is provided with the recycling center equipment 200. The information management center equipment 100 and the recycling center equipment 200 are communicably connected to each other through Internet 199.

Figure 2:
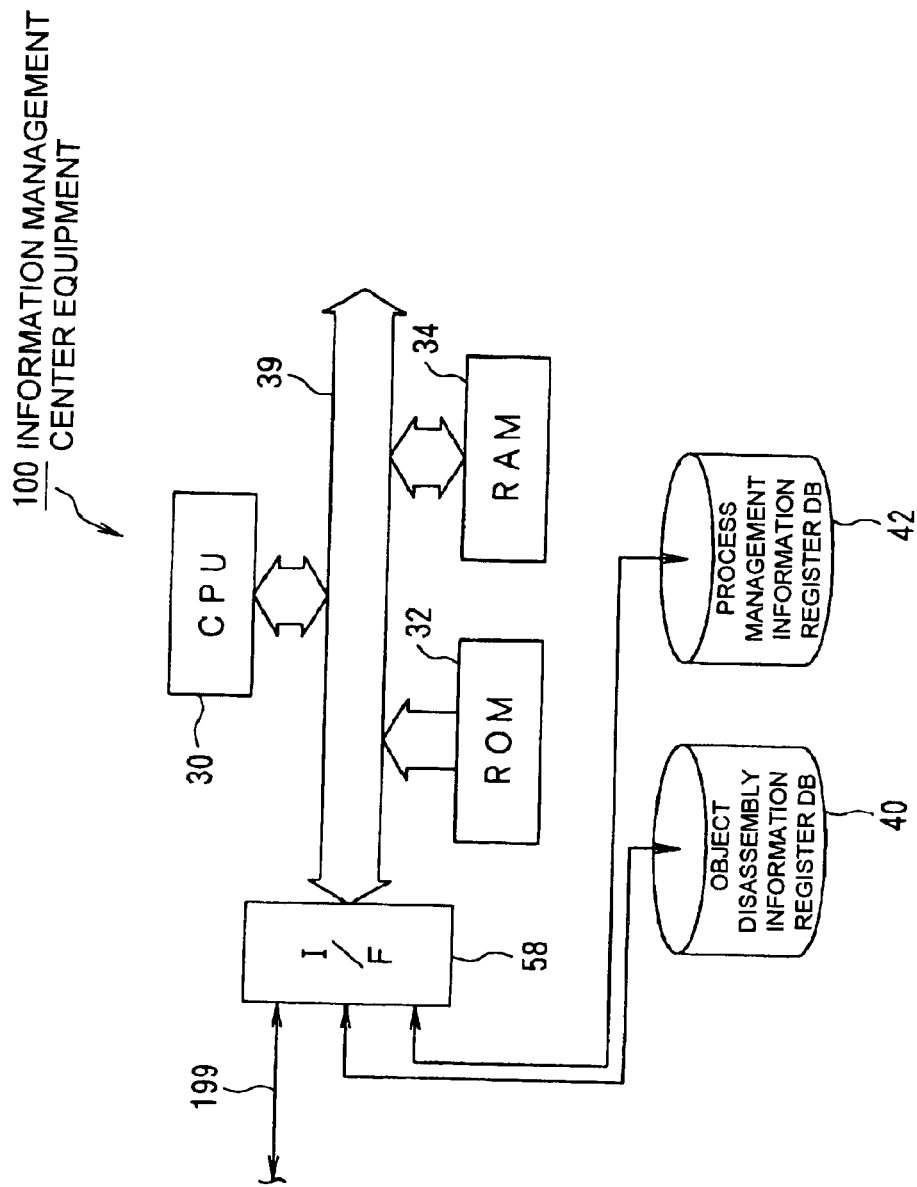
FIG. 2 is a block diagram illustrating a construction of information management center equipment 100.

Next, the construction of the information management center equipment 100 will be described in detail with reference to FIG. 2. FIG. 2 is a block diagram illustrating the construction of the information management center equipment 100. The information management center equipment 100 comprises, as shown in FIG. 2, a CPU 30 for controlling operations and the whole system based on a control program, a ROM 32 for storing the control program of the CPU 30 in a predetermined area thereof in advance, a RAM 34 for storing data read out from the ROM 32 or operational results required in the course of the operations of the CPU 30 and an I/F 38 for interfacing input and output of data with external apparatuses, and these elements are connected to each other through a bus 39 which is a signal line for transmitting data so as to transmit and receive data from each other.

The I/F 38 is connected to, external apparatuses, an object disassembly information register DB (database) 40 for registering object disassembly information for constructing a plurality of different disassembly diagrams during a process of disassembling the recycling object, a process management information register DB 42 for registering a process management information including association of external images with the object disassembly information of the recycling object, and the signal line for connection to Internet 199.

Figure 3:
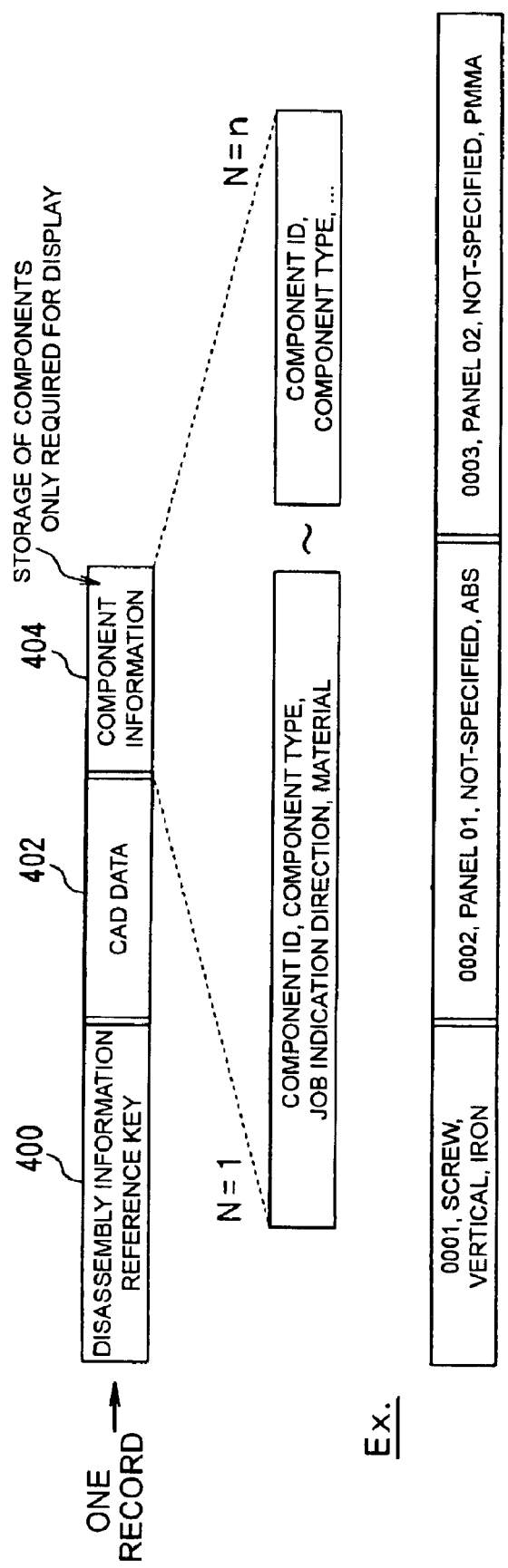
FIG. 3 is a view illustrating a data structure of an object disassembly information register DB 40.

FIG. 3 is a view illustrating a data structure of the object disassembly information register DB 40. The object disassembly information register DB 40 registers the object disassembly information by the object disassembly information associating with the object identification information (for example, product number or name of the type) for identifying a recycling object. As shown in FIG. 3, one or plural records is registered in the object disassembly information register DB 40 for every object identification information. Each of the records is for registering information for constructing the disassembly diagram explaining the order of a job in which a job proceeds to next sub process with respect to one sub process when the disassembly process is divided. Specifically, each of the records comprises a field 400 for registering a disassembly information reference key, a field 402 for registering CAD data for constructing the disassembly diagram and a field 404 for registering component information on components constituting the recycling object.

The component information is information on components required for displaying the disassembly diagram as components constituting the recycling object and includes, a component ID, a type of the component, a job indication direction and material of every component. In an example of FIG. 3, component information for a screw which is one of the components includes "0001"as the component ID, "screw" as the type of component, "vertical" as the job indication direction and "iron" as the material.

Figure 4:
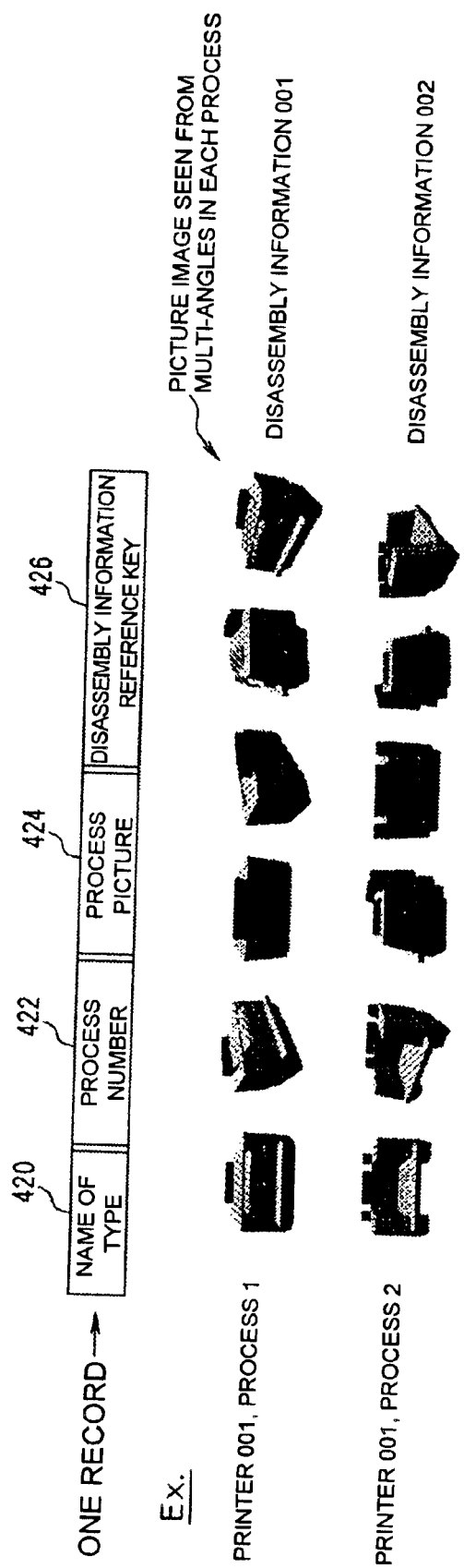
FIG. 4 is a view illustrating a data structure of a process management information register DB 42.

FIG. 4 is a view illustrating the data structure of the process management information register DB 42. The process management information register DB 42 registers the process management information by associating with the object identification information. As shown in FIG. 4, one or plural records are registered in the process management information register DB 42 for every object identification information. Each of the records is for registering information for managing one sub process with respect to such sub process when the disassembly process is divided as described above. Specifically, each of the records comprises a field 420 for registering a name of the type, a field 422 for registering a process number of the process, a field 424 for registering an external image (hereinafter, referred to as a process image) of the recycling object in the process, and a field 426 for registering the disassembly information reference key of the object disassembly information for constituting the disassembly diagram of the process. In an example of FIG. 4, "Printer 0001" as the name of type, "process 1" as the process number, the external images of the recycling object seen from a plurality of angles as the process image and "disassembly information 001" as the disassembly information reference key are registered in a first stage of record, respectively. This means that when the recycling object name of the type of which being "Printer 001" is disassembled, it is determined whether the disassembly job is in a first process or not by comparing a real external image with each of the process images. When it is determined that the disassembly job is in the first process, the disassembly diagram is constructed based on the object disassembly information specified by the disassembly information reference key of "disassembly information 001".

Figure 5:
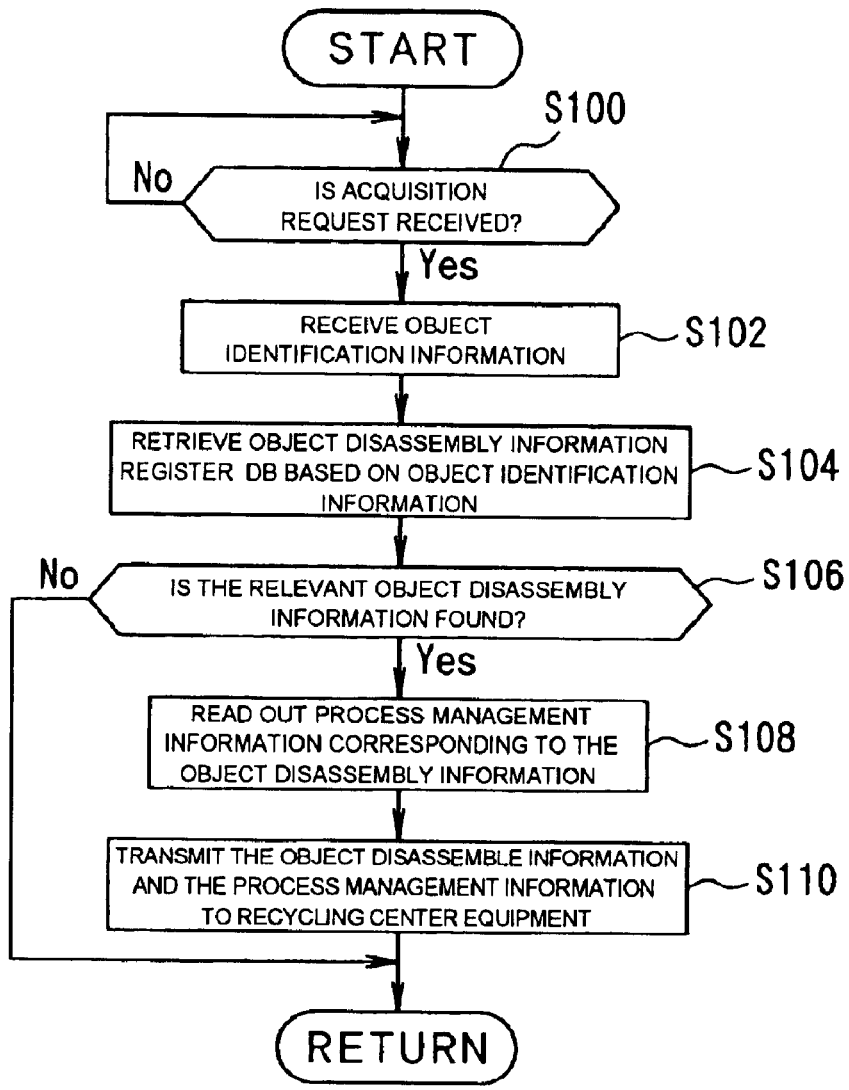
FIG. 5 is a flowchart illustrating a process of supplying object disassembly information.

The CPU 30 comprises a micro processing unit (MPU) and the like, starts a predetermined program stored in a predetermined area of the ROM 32, and executes the process of supplying the object disassembly information, as shown in the flowchart of FIG. 5 in accordance with the program.

FIG. 5 is a flowchart illustrating the process of supplying the object disassembly information.

The process of supplying the object disassembly information is a process for supplying the object disassembly information and the process management information to the recycling center equipment 200 in response to the acquisition request from the recycling center equipment 200. If the process is performed by the CPU 30, a procedure first proceeds to step S100, as shown in FIG. 5.

In step S100, it is determined whether the acquisition request of the object disassembly information and the process management information are received or not. When it is determined that an acquisition request is received (Yes), the procedure proceeds to step S102: but when it is determined that the acquisition request is not received (No), the procedure waits in step S100 until the acquisition request is received.

In step S102, the object identification information is received, the procedure proceeds to step S104 to retrieve all the object disassembly information corresponding to the object identification information from the object disassembly information register DB 40 based on the received object identification information, and then the procedure proceeds to step S106.

In step S106, it is determined whether the relevant object disassembly information is found or not and if it is determined that the relevant object disassembly information is found (Yes), the procedure proceeds to step S108 to read out all the process management information corresponding to the found object disassembly information from the process management information register DB 42. Then the procedure proceeds to step S110.

In step S110, the found object disassembly information and the read-out process management information are transmitted to the recycling center equipment 200 and a series of processes is completed to return to the original process.

On the other hand, in step S106, when it is determined that the relevant object disassembly information is not found (No), a series of processes is completed to return to the original process.

Next, a construction of the recycling center equipment 200 will be described in detail with reference to FIG. 6.

Figure 6:
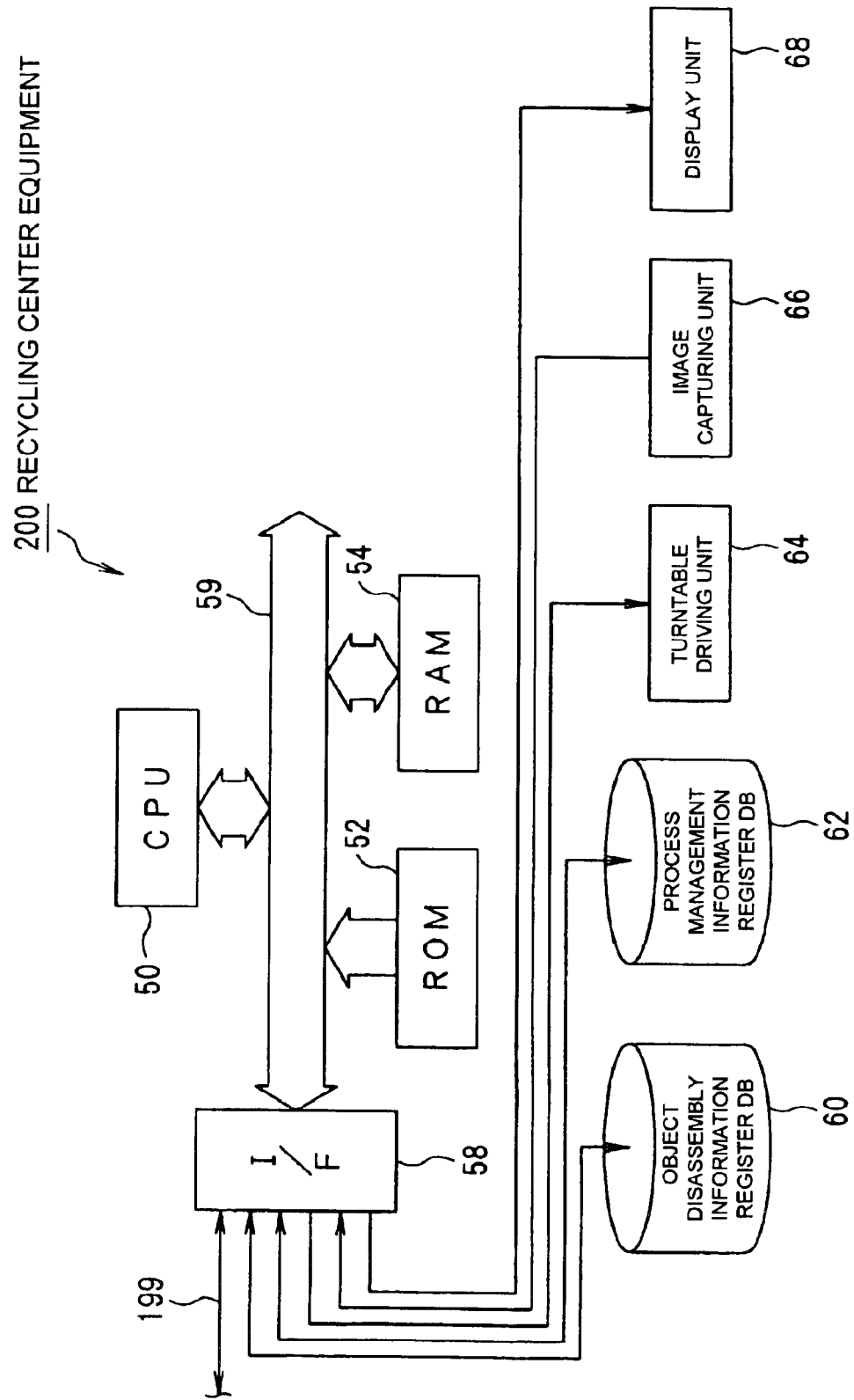
FIG. 6 is a block diagram illustrating a construction of recycling center equipment 200.

FIG. 6 is a block diagram illustrating a construction of the recycling center equipment 200.

The recycling center equipment 200 comprises, as shown in FIG. 6, a CPU 50 for controlling operations and the whole system based on a control program, an ROM 52 for storing control programs of the CPU 50 in a predetermined area thereof in advance, a RAM 54 for storing data read out from the ROM 52 or the operational results required in the course of operation of the CPU 50 and the I/F 58 for interfacing input/output of data with the external apparatuses; and, these elements are connected to each other through the bus 59 which is a signal line for transmitting data so as to transmit and receive data from each other.

The I/F 58 is connected to, as the external apparatuses, object disassembly information register DB 60 for registering the object disassembly information, the process management information register DB 62 for registering the process management information, a turntable driving unit 64 for driving a turntable (not shown) as a worktable for mounting the recycling object, an image capturing unit 66 for capturing the external image of the recycling object mounted on the turntable, a display unit 68 for displaying images on a screen based on the image signals and a signal line for connection to the Internet 199. In addition, the object disassembly information register DB 60 has the same structure as the object disassembly information register DB 40 and the process management information register DB 62 has the same structure as the process management information register DB 42.

Figure 7:
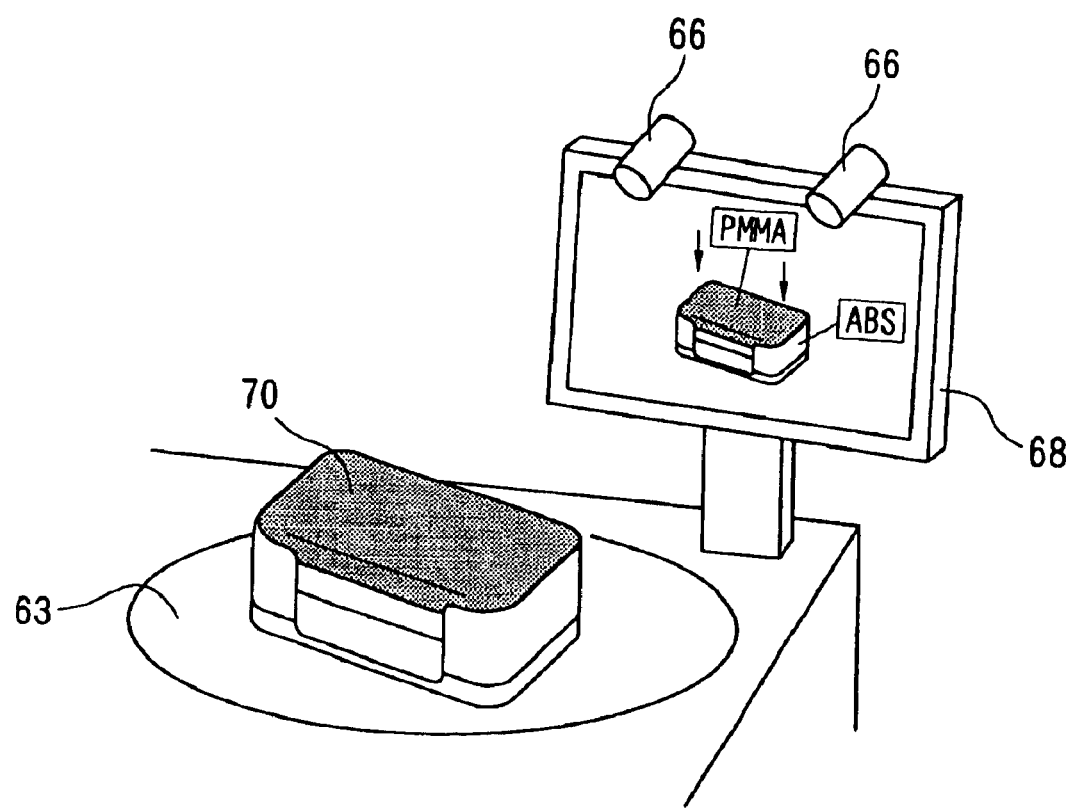
FIG. 7 is a view illustrating an arranged structure of an image capturing unit 66 and a display unit 68.

FIG. 7 is a view illustrating an arranged structure of the image capturing unit 66 and the display unit 68. In FIG. 7, the recycling object 70 is mounted on the turntable 63. The display unit 68 is provided next to the turntable 63 such that the disassembly operator can view the displayed contents during the disassembly job. The image capturing unit 66 is attached onto the display unit 68, so as to pick up the external image of the recycling object 70 mounted on the turntable 63.

Figure 8:
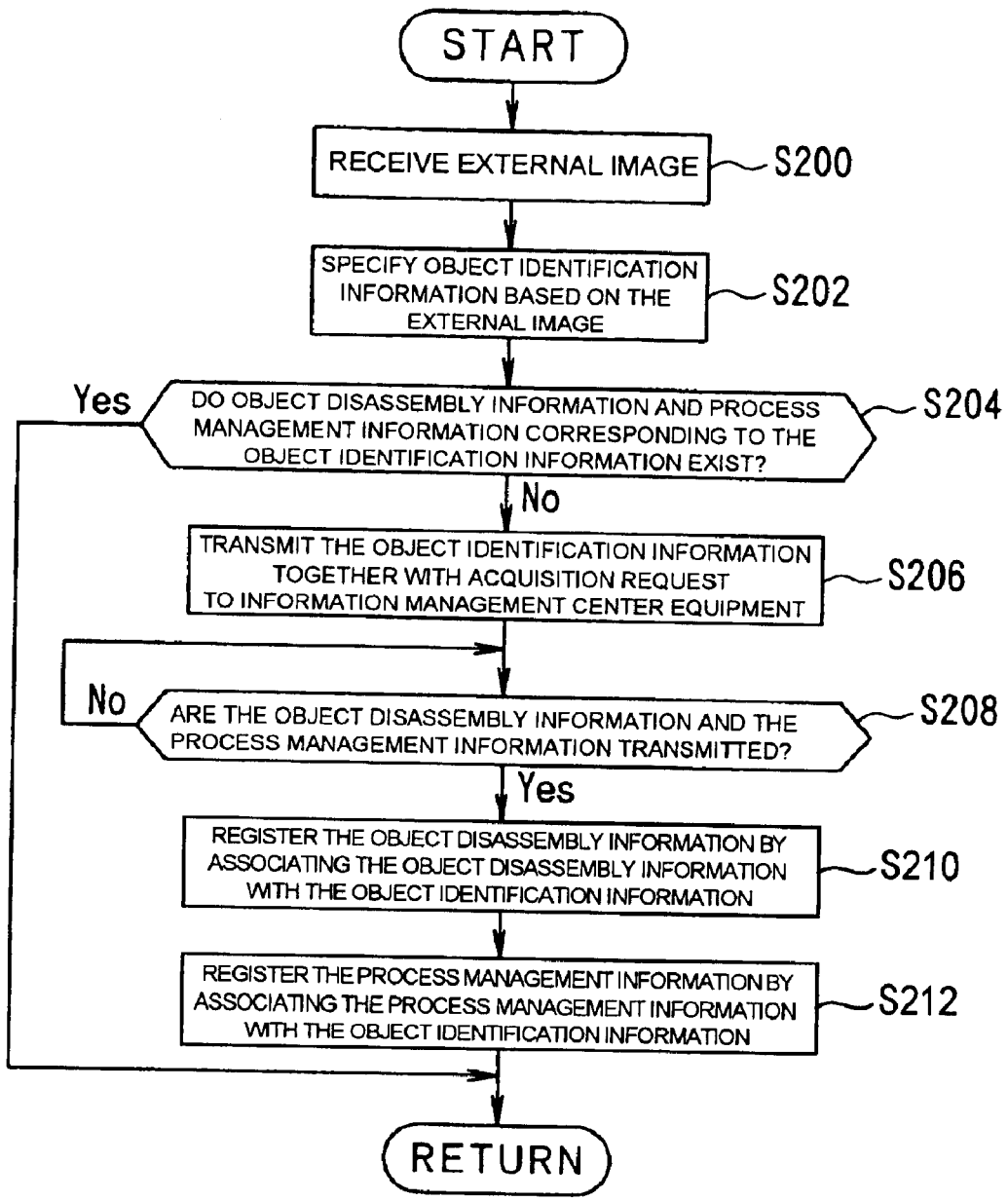
FIG. 8 is a flowchart illustrating a process of acquiring object disassembly information.
Figure 9:
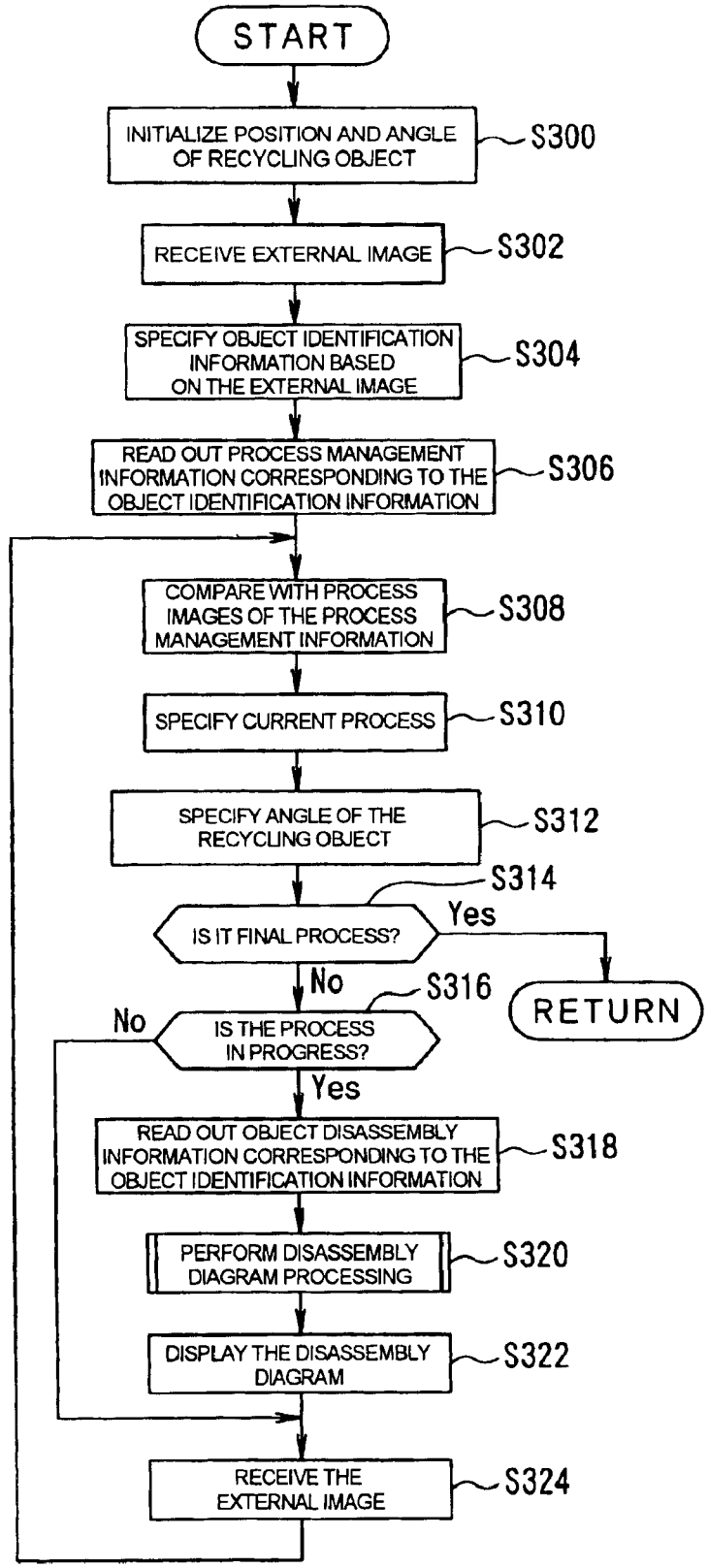
FIG. 9 is a flowchart illustrating a process of displaying a disassembly diagram.

The CPU 50 comprises a micro processing unit MPU or the like, starts a predetermined program stored in a predetermined area of the ROM 52, and executes in a time division a process of acquiring the object disassembly information and a process of displaying the disassembly diagram as shown in the flowcharts of FIGS. 8 and 9 in accordance with the program.

First, the process of acquiring the object disassembly information will be described in detail with reference to FIG. 8. FIG. 8 is a flowchart illustrating the process of acquiring the object disassembly information. The process of acquiring the object disassembly information corresponds to the process of supplying the object disassembly information of FIG. 5, is a process of acquiring the object disassembly information and the process management information from the information management center equipment 100. If the process is performed by the CPU 50, the procedure first proceeds to step S200, as shown in FIG. 8.

In step S200, the external image of the recycling object 70 mounted on the turntable 63 is taken in by the image capturing unit 66, then the procedure proceeds to step S202 to specify the object identification information of the recycling object 70 based on the taken-in external image. Then, the procedure proceeds step S204.

In step S204, it is determined whether the object disassembly information and the process management information corresponding to a specified object identification information exist in the object disassembly information register DB 60 and the process management information register DB 62 or not; and, when it is determined that the object disassembly information and the process management information corresponding to the specified object identification information do not exist (No), the procedure proceeds to step S206 to transmit the specified object identification information together with the acquisition request to the information management center equipment 100. Then, the procedure proceeds to step S208.

In step S208, it is determined whether the object disassembly information and the process management information are received or not; and, if it is determined that the object disassembly information and the process management information are received (Yes), the procedure proceeds to step S210, but if it is determined that they are not received (No), the procedure waits in step S208 until the object disassembly information and the process management information are received.

In step S210, the received object disassembly information is registered in the object disassembly information register DB 60 in correspondence to the object identification information, the procedure proceeds to step S212 to register the received process management information in the process management information register DB 62 by association with the object identification information, then a series of processes is completed to return to the original process.

On the other hand, in step S204, if it is determined that the object disassembly information and the process management information corresponding to the specified object identification information exist in the object disassembly information register DB 60 and in the process management information register DB 62 (Yes), a series of processes is completed to return to the original process.

Next, the process of displaying the disassembly diagram will be described in detail with reference to FIG. 9.

FIG. 9 is flowchart illustrating the process of displaying the disassembly diagram. The process of displaying the disassembly diagram is executed accompanying start of the disassembly job, is a process of displaying the disassembly diagram in the display unit 68 depending on the progress condition of the disassembly job of the recycling object 70. When the process is performed by the CPU 50, the procedure first proceeds to step S300, as shown in FIG. 9.

In step S300, the turntable driving unit 64 is driven to initialize a position and an angle of the recycling object 70 mounted on the turntable 63 then, the procedure proceeds to step S302. In step S302, the external image of the recycling object 70 mounted on the turntable 63 is taken in by means of the image capturing unit 66, then the procedure proceeds to step S304 to specify the object identification information of the recycling object 70 based on the taken-in external image. Then, the procedure proceeds to step S306.

In step S306, all the process management information corresponding to the specified object identification information is read out from the process management information register DB 62, the procedure proceeds to step S308 to compare the taken-in external image with each of the process images included in the read-out process management information and to specify a process image equal or similar to the taken-in external image from each of the process images, and then the procedure proceeds to step S310.

In step S310, the current process is specified from the specified process image, the procedure proceeds to step S312 to specify the angle of the recycling object 70 mounted on the turntable 63 based on the external image taken-in in steps S302 and S324, then the procedure proceeds to step S314.

In step S314, it is determined whether the current process is a final process or not; and, if it is determined that the current process is not the final process (No), the procedure proceeds to step S316 to determine whether the previous process and the current process are different from each other based on the previous determination result or not. If it is determined that the previous process and the current process are different from each other (Yes), the procedure proceeds to step S318.

In step S318, the specified object identification information and the object disassembly information corresponding to the current process are read out from the object disassembly information register DB 60, the procedure proceeds to step S320 to perform the disassembly diagram constructing process of constructing the disassembly diagram based on the read-out object disassembly information. Then, the procedure proceeds to step S322 to display the constructed disassembly diagram in the display unit 68, the procedure proceeds to step S324 to take the external image of the recycling object 70 mounted on the turntable 63 by means of the image capturing unit 66, then the procedure proceeds to step S308.

In the meanwhile, in step S316, if it is determined that the previous process and the current process are the same (No), the procedure proceeds to step S324.

On the other hand, in step S314, if it is determined that the current process is the final process (Yes), a series of processes is completed to return to the original process.

Next, a process of constructing the disassembly diagram in the step S320 will be described in detail with reference to FIG. 10.

Figure 10:
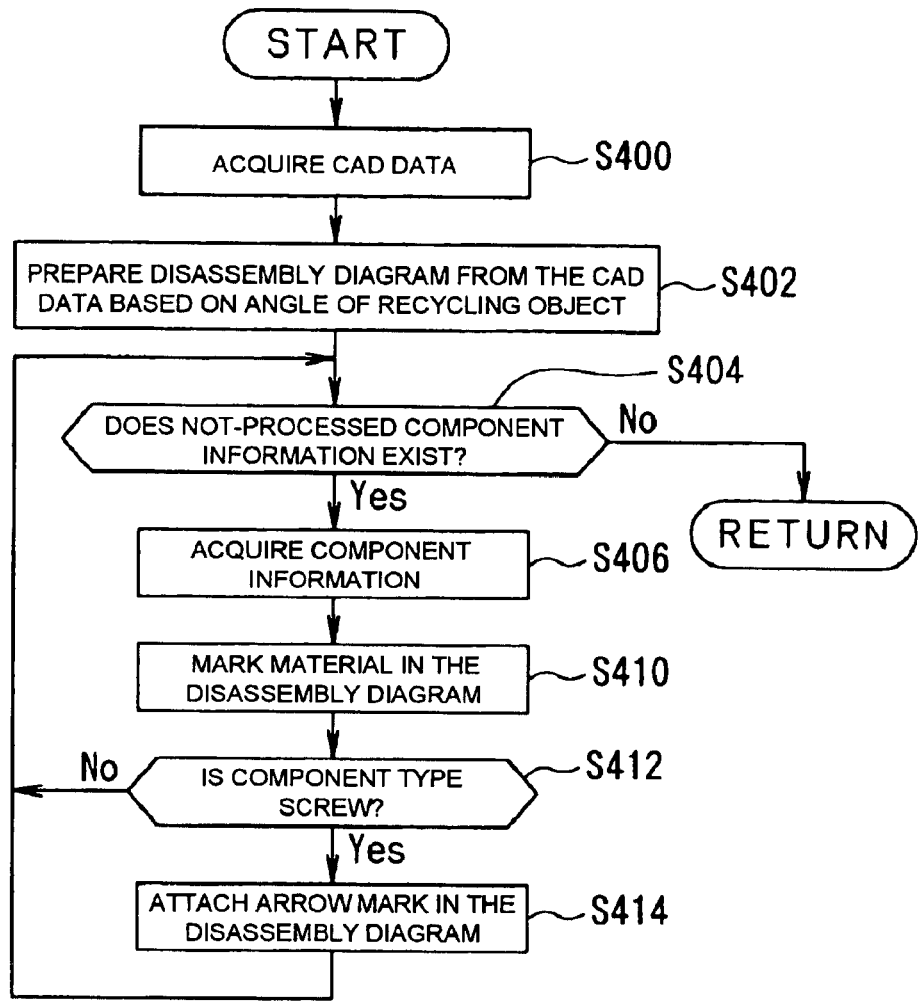
FIG. 10 is a flowchart illustrating a process of constructing a disassembly diagram.

FIG. 10 is a flowchart illustrating the process of constructing the disassembly diagram.

When the process of constructing the disassembly diagram is executed in the step S320, the procedure first proceeds to step S400 as shown in FIG. 10.

In step S400, the CAD data is acquired from the object disassembly information read out in step S318, the procedure proceeds to step S402 to construct the disassembly diagram using the CAD data based on the angle of the recycling object 70 specified in step S312 such that the disassembly diagram is a front view when seen from the disassembly operator, then the procedure proceeds to step S404.

In step S404, it is determined whether non-processed component information exists in the read-out object disassembly information or not, and if it is determined that the non-processed component information exists (Yes), the procedure proceeds to step S406 to acquire the non-processed component information from the read-out object disassembly information. Then, the procedure proceeds to step S410 to indicate the material of the relevant component (means a component corresponding to the read-out component information) of the disassembly diagram based on the acquired component information, then the procedure proceeds to step S412.

In step S412, it is determined whether the component type of the relevant component is a screw or not. If it is determined that the component type of the relevant component is the screw (Yes), the procedure proceeds to step S414 to mark the arrow along the job indicating direction in the disassembly diagram and then proceeds to step S404.

On the other hand, in step S412, if it is determined that the component type of the relevant component is not the screw (No), the procedure proceeds to step S404.

On the other hand, in step S404, if it is determined that the non-processed component information does not exist in the read-out object disassembly information (No), a series of processes is completed to return to the original process.

Next, operations of the present embodiment will be described.

First, in the recycling center 20, before disassembling the recycle object 70, the disassembly operator mounts the recycling object 70 on the turntable 63 and reads out the external image of the recycling object 70 using the image capturing unit 66, in order to acquire the object disassembly information.

In the recycling center equipment 200, when the external image of the recycling object 70 is taken in, the object identification information of the recycling object 70 is specified based on the taken-in external image and the specified object identification information is transmitted together with the acquisition request to the information management center equipment 100, through steps S202 to S206.

In the information management center equipment 100, when the object identification information is received together with the acquisition request, all the object disassembly information corresponding to the object identification information is retrieved from the object disassembly information register DB 40 based on the received object identification information through step S104. As a result, when the relevant object disassembly information is found, process management information corresponding to the found object disassembly information is read out from the process management information register DB 42 through steps S108 and S110 and the found object disassembly information and the read-out process management information are transmitted to the recycling center equipment 200.

In the recycling center equipment 200, when the object disassembly information and the process management information are received, the received object disassembly information is registered in the object disassembly information register DB 60 in correspondence to the object identification information and the received process management information is associated with the object identification information to be registered in the process management information register DB 62, through steps S210 and S212. Accordingly, the recycling center equipment 200 can acquire the object disassembly information and the process management information required for the disassembly job.

Next, in the recycling center 20, the disassembly operator reads out the external image of the recycling object 70 mounted on the turntable 63 by means of the image capturing unit 66.

In the recycling center equipment 200, when the external image of the recycling object 70 is taken in, the object identification information of the recycling object 70 is specified based on the taken-in external image and all the process management information corresponding to the specified object identification information is read out from the process management information register DB 62, through steps S304 and S306. Next, the taken-in external image is compared with each of the process images included in the read-out process management information through step S308 and a process image equal or similar to the taken-in external image is specified from the process images.

Next, through steps S310 and S312, the current process is specified from the specified process image and the angle of the recycling object 70 mounted on the turntable 63 is specified based on the taken-in external image. At that time, when the current process is not the final process and the previous process and a current process are different from each other, a specified object identification information and the object disassembly information corresponding to the current process are read out from the object disassembly information register DB 60 and the disassembly diagram is constructed based on the read-out object disassembly information, through steps S318 and S320. Specifically, CAD data is acquired from the object disassembly information and a disassembly diagram is constructed from the CAD data based on the angle of the recycling object 70 such that the disassembly diagram is a front view when seen from the disassembly operator, through steps S400 and S402. Next, the component information is acquired from the object disassembly information and the material of the relevant component in the disassembly diagram is marked based on the acquired component information, through steps S406 and S410. In addition, when the component type of the relevant component is a screw, the arrow agreeing with the job indicating direction is marked in the disassembly diagram through step S414. Then, processes of steps S406 to S414 are performed against all the component information included in the object disassembly information.

Figure 11:
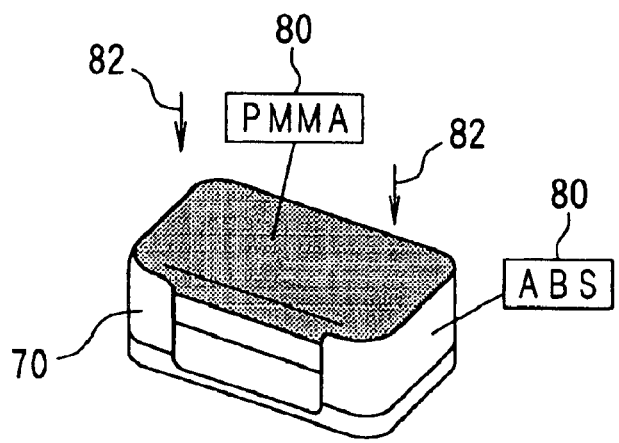
FIG. 11 is a view illustrating an example of a disassembly diagram.

FIG. 11 is a view illustrating an example of the disassembly diagram. In the example of FIG. 11, a material mark 80 is attached to the components constituting the recycling object 70 and an arrow mark 82 is attached to the screw constituting the recycling object 70 along the job indicating direction. Further, "PMMA" in the material mark 80 indicates acryl and "ABS" in the material mark 80 indicates an ABS resin.

In the recycling center equipment 200, when the disassembly diagram is constructed, the constructed disassembly diagram is displayed in the display unit 68 and the external image of the recycling object 70 is taken in, through steps S322 and S324. Then, the processes of steps S308 to S324 are performed repeatedly until the disassembly job is the final process.

By doing so, in the present embodiment, the information management center equipment 100 has the object disassembly information register DB 40 in which the object disassembly information is registered by associating the object disassembly information with the object identification information, retrieves the object disassembly information from the object disassembly information register DB 40 based on the received object identification information when receiving the object identification information, and transmits the object disassembly information found through the retrieval to the recycling center equipment 200. The recycling center equipment 200 reads out the object identification information from the recycling object 70, transmits the read-out object identification information to the information management center equipment 100, and when receiving the object disassembly information, constructs any one of the plurality of disassembly diagrams which can be constructed through the received object disassembly information depending on the progress condition of the disassembly job of the recycling object 70 in order to display the constructed disassembly diagram in the display unit 68.

Accordingly, since the disassembly operator can find out the specific disassembly order for how to disassemble the recycling object 70 from the disassembly diagram, and can understand the relatively-proper order depending on the progress condition of the disassembly job without exerting an effort or time. Therefore, it is possible to perform the disassembly job more efficiently compared with the conventional art.

Further, in the present embodiment, the recycling center equipment 200 has the image capturing unit 66 for taking the external image of the recycling object 70 in, determines the progress condition of the disassembly job of the recycling object 70 based on the external image taken in by the image capturing unit 66, and constructs any one of the plurality of disassembly diagrams which can be constructed from the received object disassembly information depending on the progress condition determined by the disassembly diagram constructing means.

Accordingly, since the progress condition of the disassembly job is determined from the external image of the recycling object 70, the disassembly operator can find a more proper order depending on the progress condition of the disassembly job. In addition, the disassembly operator does not have to specially instruct the progressing conditions during the disassembly job. Therefore, it is possible to perform the disassembly job more efficiently.

Furthermore, in the present embodiment, the information management center equipment 100 has the process management information register DB 42 for registering the process management information, reads out the process management information corresponding to the object disassembly information retrieved through the retrieval from the process management information register DB 42, and transmits the retrieved object disassembly information and the read-out process management information to the recycling center equipment 200. In addition, when receiving the object disassembly information and the process management information, the recycling center equipment 200 compares the external image taken in by the image capturing unit 66 with each of the process images included in the received process management information to specify an external image equal or similar to the external image taken in by the image capturing unit 66. Then, the recycling center equipment 200 constructs the disassembly diagram corresponding to the specified external image among the plurality of disassembly diagrams which can be constructed through the received object disassembly information.

Accordingly, since the disassembly diagram corresponding to the external image of the recycling object 70 is constructed, the disassembly operator can find out a more proper order depending on the progress condition of the disassembly job. Therefore, it is possible to perform the disassembly job more efficiently.

Furthermore, in the present embodiment, the recycling center equipment 200 constructs the disassembly diagram so as to be a front view of the recycling object 70 when seen from the disassembly operator.

Accordingly, since the disassembly operator can view the front view of the disassembly diagram, the disassembly operator can easily catch the specific disassembly order for how to disassemble the recycling object 70. Therefore, it is possible to perform the disassembly job more efficiently.

Furthermore, in the present embodiment, the disassembly diagram includes the material mark 80 for classifying the material of components constituting the recycling object 70.

Accordingly, since the disassembly operator can classify the components constituting the recycling object 70 by referring to the displayed material mark 80, the classification job is facilitated. Therefore, it is possible to efficiently perform the classification job compared with the conventional art.

Furthermore, in the present embodiment, the disassembly diagram includes the arrow mark 82 for indicating the position of the screw for coupling components constituting the recycling object 70.

Accordingly, since the disassembly operator can find out the position of the screw for coupling components which constitutes the recycling object 70 by referring to the displayed arrow mark 82, the disassembly job is facilitated. Therefore, it is possible to perform the disassembly job more efficiently.

In the above embodiment, the object disassembly information register DB 40 corresponds to the object disassembly information storage means, the process management information register DB 42 corresponds to the process management information storage means, and step S102 corresponds to the object identification information receiving means. In addition, step S104 corresponds to the object disassembly information retrieving means or the object disassembly information retrieving step, step S110 corresponds to the object disassembly information transmitting means, and steps S200 and S202 correspond to the object identification information input means, the object identification information read-out means or the object identification information input step.

Furthermore, in the above embodiment, step S206 corresponds to the object identification information transmitting means step S208 corresponds to the object disassembly information receiving means and the image capturing unit 66 and step S302 correspond to the external image taking means. In addition, the display unit 68 and step S322 correspond to the disassembly diagram output means, the disassembly diagram display means or the disassembly diagram output step and steps S400 to S414 correspond to the disassembly diagram constructing means or the disassembly diagram constructing step described in claim 13.

Furthermore, in the above embodiment, the material mark 80 corresponds to the explanation for classifying the material, and an arrow mark 82 corresponds to the explanation for indicating the position of the screw.

Figure 12:
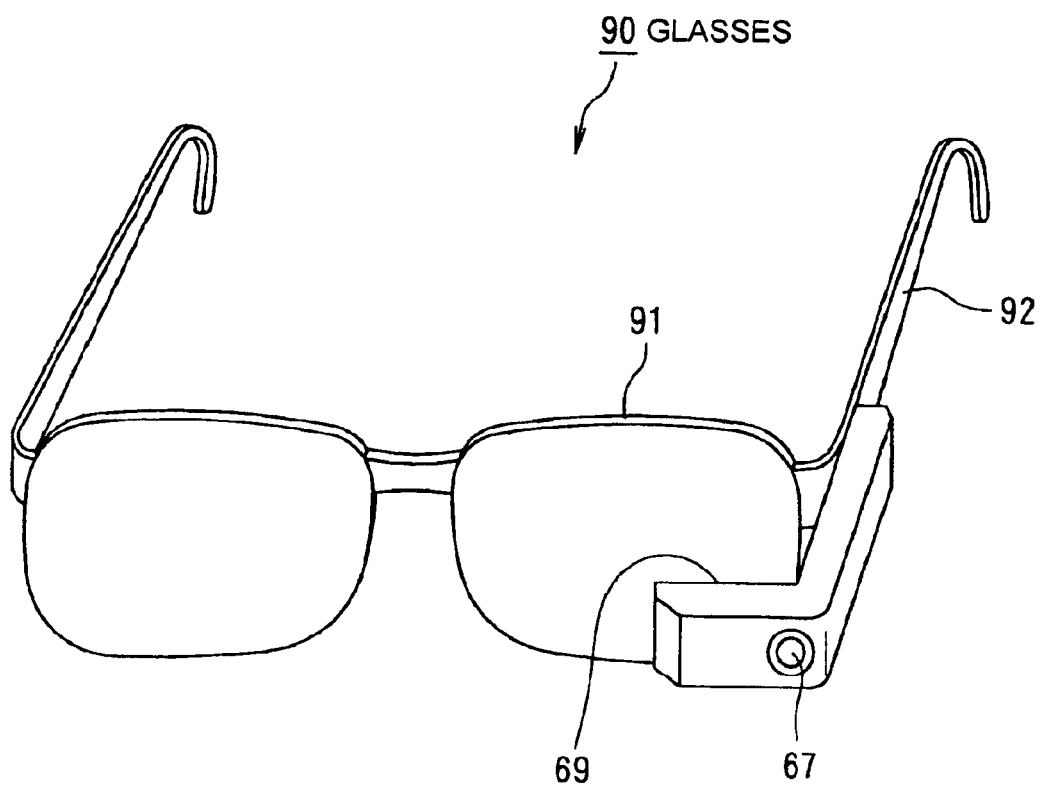
FIG. 12 is a view illustrating a construction of glasses 90 which are worn by a disassembly operator, the glasses being provided with a display unit and an image capturing unit.

Furthermore, in the above embodiment, although the display unit 68 is provided in the turntable 63 and the image capturing unit 66 is provided in the display unit 68, it is not limited to this but the display unit and the image capturing unit may be provided in the glasses 90 which are worn by the disassembly operator, as shown in FIG. 12.

FIG. 12 is a view illustrating a construction of the glasses 90 when the display unit and the image capturing unit are provided in the glasses 90 which are worn by the disassembly operator. In FIG. 12, the display unit 69 comprising a LCD (liquid crystal display) and the like is provided at one of lenses 91 of the glasses 90 such that the disassembly operator wearing the glasses 90 can view the disassembly diagram displayed in the display unit 69, and the image capturing unit 67 is provided in the frame 92 of the glasses such that the disassembly operator wearing the glasses 90 can take the external image of the recycling object 70 while viewing the recycling object 70.

According to the above construction, in the recycling center equipment 200, since the one of lenses 91 of the glasses 90 is provided with the display unit 69, the disassembly operator wearing the glasses 90 can view the disassembly diagram displayed in the display unit 69. In addition, since the frame 92 of the glasses 90 is provided with the image capturing unit 67, when the disassembly operator views the recycling object 70 wearing the glasses 90, the external image of the recycling object 70 is taken in by the image capturing unit 67.

Accordingly, since the disassembly operator can progress the disassembly job while viewing the disassembly diagram through the glasses 90, more pain or time is not required for referring to the disassembly diagram. In addition, since the external image of the recycling object 70 can be taken in from the point of view of the disassembly operator then the progress condition of the disassembly job can be relatively found accurately, a more proper order can be found depending on the progress condition of the disassembly job. Therefore, it is possible to perform the disassembly job more efficiently.

In this regard, the image capturing unit 67 corresponds to the external image taking means, and the display unit 69 corresponds to the disassembly diagram display means.

Furthermore, in the above embodiment, although a case has been described in which the control program stored in the ROM 32 in advance is executed in executing the processes shown in the flowchart of FIG. 5, it is not limited to this, but the program may be executed by reading in the RAM 34 from the storage medium storing the program of indicating the order thereof.

Furthermore, in the above embodiment, although a case has been described in which the control program stored in the ROM 52 in advance is executed in executing the processes shown in the flowcharts of FIGS. 8 to 10, it is not limited to this, but the program may be read in the program to the RAM 54 from the storage medium storing the program of indicating the order thereof.

Herein, the storage medium may be a semiconductor storage medium such as RAM or ROM, a magnetically-stored storage medium such as FD or HD, or an optically-read-out storage medium such as CD, CDV, LD or DVD, and may include any the storage medium only if the storage medium can be read out by a computer regardless of a read-out method such as an electronic method, a magnetic method, an optical method and the like.

Furthermore, in the above embodiment, although a case has been described in which the recycling job supporting system, the recycling center equipment, the information management center equipment and the program for the equipment, and the recycling job supporting method according to the present invention are applied to the network system comprising the Internet 199, it is not limited to this, but they may be applied to, for example, a so-called intranet for performing communication in the same manner as the Internet 199.

Of course, they may be applied to a usual network, not limited to the network for performing communication in the same manner as the Internet 199.

Furthermore, in the above embodiment, although the recycling job supporting system, the recycling center equipment, the information management center equipment and the program for the equipment, and the recycling job supporting method according to the present invention are applied to a case of disassembling and classifying the recycling objects such as office automation products or home electronics in the recycling center 20 as shown in FIG. 1, they are not limited to this case and are applicable to other cases without departing from the main concept of the present invention.

The entire disclosure of Japanese Patent Application No. 2002-331172 filed Nov. 14, 2002 is incorporated by reference.

What is claimed is:

1. A recycling job supporting system for supporting a disassembling job of a recycling object in a recycling center, and communicably connecting recycling center equipment provided in the recycling center for disassembling the recycling object to be recycled and information management center equipment provided in an information management center for managing information for supporting a recycling job to each other, the recycling center equipment comprising:
a computer system;
object identification information read-out means for reading out object identification information for identifying in the recycling object, said means for reading out object identification information being operably coupled to the computer system;
object identification information transmitting means for transmitting the object identification information read out by the object identification information read-out means to the information management center equipment;
object disassembly information receiving means for receiving object disassembly information for constructing a plurality of different disassembly diagrams during a process of disassembling the recycling object;
disassembly diagram constructing means for constructing the disassembly diagrams based on the object disassembly information received by the object disassembly information receiving means; and
disassembly diagram display means for displaying the disassembly diagrams constructed by the disassembly diagram constructing means, the information management center equipment comprising:
object disassembly information storage means for storing the object disassembly information by associating the object disassembly information with the object identification information;
object identification information receiving means for receiving the object identification information;
object disassembly information retrieving means for retrieving the object disassembly information from the object disassembly information storage means based on the object identification information received by the object identification information receiving means; and
object disassembly information transmitting means for transmitting the object disassembly information found by the object disassembly information retrieving means to the recycling center equipment, wherein the disassembly diagram constructing means constructs any one of the plurality of disassembly diagrams which can be constructed through the object disassembly information received by the object disassembly information receiving means depending on a progress condition of a disassembly job of the recycling objects;

wherein the recycling center equipment further comprises external image taking means for taking an external image of the recycling object, and wherein the disassembly diagram constructing means determines a progress condition of the disassembly lob of the recycling object based on the external image taken by the external image taking means, and depending on the progress condition determined by the disassembly diagram constructing means, constructs any one of the plurality of disassembly diagrams which can be constructed through the object disassembly information received by the object disassembly information receiving means, wherein the object disassembly information is information for constructing the disassembly diagram for explaining a job order in which a job proceeds to a next sub process with respect to a relevant sub process for every sub process when the disassembly job is divided into sub processes, wherein the information management center equipment further comprises process management information storage means for storing process management information including association of the external image of the recycling object with the object disassembly information for every sub process, wherein the object disassembly information transmitting means reads out the process management information corresponding to the object disassembly information found by the object disassembly information retrieving means from the process management information storage means, and transmits the found object disassembly information and the read-out process management information to the recycling center equipment, wherein the object disassembly information receiving means receives the object disassembly information and the process management information, and wherein the disassembly diagram constructing means compares the external image taken by the external image taking means with each of the external images included in the process management information received by the object disassembly information receiving means, specifies an external image at least similar to the external image taken by the external image taking means from each of the external images, and constructs a disassembly diagram corresponding to the specified external image among the plurality of disassembly diagrams which can be constructed through the object disassembly information received by the object disassembly information receiving means.

2. A recycling job supporting system according to claim 1, wherein the recycling center equipment further comprises a pair of glasses, wherein one of lenses of the glasses is provided with the disassembly diagram display means such that an operator wearing the glasses can view the disassembly diagram displayed in the disassembly diagram display means; and, wherein a frame of the glasses is provided with the external image taking means such that the operator wearing the glasses can take the external image of the recycling object while viewing the recycling object.

3. A recycling job supporting system according to claim 1, wherein the disassembly diagram constructing means constructs the disassembly diagrams as a front view of the recycling object when seen from a viewpoint of a disassembly operator.

4. A recycling lob supporting system according to claim 1, wherein the disassembly diagrams include instructions for classifying component materials constituting the recycling object.

5. A recycling job supporting system according to claim 1, wherein the disassembly diagrams include instructions for indicating positions of screws for coupling components constituting the recycling object.

6. A recycling job support system comprising:

a central information management computer:

recycling equipment having an object identification information read-out means for reading out object identification information for identifying the recycling object from the recycling object;

object identification information transmitting means for transmitting the object identification information read out by the object identification information read-out means to the information management center equipment;

object disassembly information receiving means for receiving object disassembly information for constructing a plurality of different disassembly diagrams during a process of disassembling the recycling object;

disassembly diagram constructing means for constructing the disassembly diagrams based on the object disassembly information received by the object disassembly information receiving means; and disassembly diagram display means for displaying the disassembly diagrams constructed by the disassembly diagram constructing means;

wherein the disassembly diagram constructing means constructs any one of the plurality of disassembly diagrams which can be constructed through the object disassembly information received by the object disassembly information receiving means depending on a progress condition of the disassembly job of the recycling object, wherein the recycling center equipment further comprises external image taking means for taking an external image of the recycling object, wherein the disassembly diagram constructing means determines a progress condition of the disassembly job of the recycling object based on the external image taken by the external image taking means, and depending on the progress condition determined by the disassembly diagram constructing means, constructs any one of the plurality of disassembly diagrams which can be constructed through the object disassembly information received by the object disassembly information receiving means, wherein the object disassembly information is information for constructing the disassembly diagram for explaining a job order in which a job proceeds to a next sub process with respect to a relevant sub process for every sub process when the disassembly job is divided into sub processes, wherein the information management center equipment further comprises process management information storage means for storing process management information including association of the external image of the recycling object with the object disassembly information for every sub process, wherein the object disassembly information transmitting means reads out the process management information corresponding to the object disassembly information found by the object disassembly information retrieving means from the process management information storage means, and transmits the found object disassembly information and the read-out process management information to the recycling center equipment, wherein the object disassembly information receiving means receives the object disassembly information and the process management information, and wherein the disassembly diagram constructing means compares the external image taken by the external image taking means with each of the external images included in the process management information received by the object disassembly information receiving means, specifies an external image at least similar to the external image taken by the external image taking means from each of the external images, and constructs a disassembly diagram corresponding to the specified external image among the plurality of disassembly diagrams which can be constructed through the object disassembly information received by the object disassembly information receiving means.

7. The recycling job supporting system according to claim 6, comprising:

object disassembly information storage means for storing object disassembly information by associating the object disassembly information with object identification information;

object identification information receiving means for receiving the object identification information;

object disassembly information retrieving means for retrieving the object disassembly information from the object disassembly information storage means based on the object identification information received by the object identification information receiving means; and object disassembly information transmitting means for transmitting the object disassembly information found by the object disassembly information retrieving means to the recycling center equipment.

8. The recycling job support system according to claim 6, wherein the recycling center equipment comprises a computer system, the program executing processes implemented by:

the object identification information read-out means for reading out object identification information for identifying recycling object from the recycling object;

the object identification information transmitting means for transmitting the object identification information read out by the object identification information read-out means to information management center equipment;

the object disassembly information receiving means for receiving object disassembly information for constructing a plurality of different disassembly diagrams during a process of disassembling the recycling object;

the disassembly diagram constructing means for constructing the disassembly diagrams based on the object disassembly information received by the object disassembly information receiving means; and the disassembly diagram display means for displaying the disassembly diagrams constructed by the disassembly diagram constructing means;

wherein the disassembly diagram constructing means constructs any one of the plurality of disassembly diagrams which can be constructed through the object disassembly information received by the object disassembly information receiving means depending on a progress condition of the disassembly job of the recycling object.

9. The recycling job support system according to claim 7, wherein the information management computer is configured to execute processes implemented by:

the object identification information receiving means for receiving the object identification information;

the object disassembly information retrieving means for retrieving object disassembly information based on the object identification information received by the object identification information receiving means from the object disassembly information storage means for storing the object disassembly information by associating the object disassembly information with the object identification information; and the object disassembly information transmitting means for transmitting the object disassembly information found by the object disassembly information retrieving means to the recycling center equipment.

10. A recycling job supporting method for supporting a disassembling job of a recycling object to be recycled, comprising:

taking a first external image of the object to be recycled;

inputting object identification information for identifying a recycling object;

retrieving object disassembly information based on the object identification information input in the object identification information input step from object disassembly information storage means for storing the object disassembly information for constructing a plurality of different disassembly diagrams during a process of disassembling the recycling object by associating the object disassembly information with the object identification information;

determining a progress condition of the disassembly of the product being recycled;

constructing the disassembly diagrams based on the object disassembly information from the object disassembly information retrieving step; and outputting the disassembly diagrams constructed in the disassembly diagram constructing step, wherein the disassembly diagram constructing step constructs any one of the plurality of disassembly diagrams which can be constructed through the object disassembly information from the object disassembly information retrieving step depending on a progress condition of the disassembly job of the recycling object;

wherein constructing the disassembly diagram comprises comparing the first external image taken with a plurality of second external images to determine which of the second external images is at least similar to the first external image taken, and constructing a disassembly diagram corresponding to a specified second external image among the disassembly diagrams.

11. A recycling job supporting system for supporting a disassembling job of a recycling object in a recycling center, and communicably connecting recycling center equipment provided in the recycling center for disassembling the recycling object to be recycled and information management center equipment provided in an information management center for managing information for supporting a recycling job to each other, the recycling center equipment comprising:

a computer system;

an imager configured to capture an image of the product to be recycled;

an object identification information reader configured to read object identification information for identifying the recycling object, said reader being operably coupled to the computer system;

an object identification information transmitter configured to transmit the object identification information read out by the reader to the information management center;

a buffer configured to receive object disassembly information;

a disassembly diagram constructor configured to construct the disassembly diagrams based on the object disassembly information received by the buffer; and a display configured to display the disassembly diagrams constructed by the disassembly diagram constructor, the information management center equipment comprising:
- object disassembly information storage configured to store the object disassembly information by associating the object disassembly information with the object identification information;
- object identification information receiver configured to receive the object identification information;
- an object disassembly information retriever configured to retrieve the object disassembly information from the object disassembly information storage based on the object identification information received by the object identification information receiver; and
- an object disassembly information transmitter configured to transmit the object disassembly information found by the object disassembly information retriever to the recycling center equipment;

wherein the disassembly diagram constructor constructs a plurality of disassembly diagrams which can be constructed through the object disassembly information received by the object disassembly information receiver depending on a progress condition of a disassembly job of the recycling object;

wherein the disassembly diagram constructor determines a progress condition of the disassembly job of the recycling object based on the external image taken by the imager, and depending on a progress condition determined by the disassembly diagram constructor, constructs any one of a plurality of disassembly diagrams which can be constructed through the object disassembly information received by the object disassembly information receiver, wherein the object disassembly information is information for constructing the disassembly diagram to explain a job order in which a job proceeds to a next sub process with respect to a relevant sub process for every sub process when the disassembly job is divided into sub processes, wherein the information management center further comprises a memory configured for storing process management information including association of the external image of the recycling object with the object disassembly information for every sub process, wherein the object disassembly information transmitter reads out the process management information corresponding to the object disassembly information found by the object disassembly information retriever from the memory, and transmits the found object disassembly information and the read-out process management information to the recycling center equipment, wherein the object disassembly information receiver receives the object disassembly information and the process management information, and wherein the disassembly diagram constructor compares the image taken by the imager with each of the external images included in the process management information received by the object disassembly information receiver, specifies an external image at least similar to the image taken by the imager, and constructs a disassembly diagram corresponding to the specified external image among the plurality of disassembly diagrams which can be constructed through the object disassembly information received by the object disassembly information receiver.

* * * * *

UNITED STATES PATENT AND TRADEMARK OFFICE
CERTIFICATE OF CORRECTION

PATENT NO. : 6,952,625 B2 Page 1 of 1
APPLICATION NO. : 10/686030
DATED : October 4, 2005
INVENTOR(S) : Akihito Uetake et al.

It is certified that error appears in the above-identified patent and that said Letters Patent is hereby corrected as shown below:

Column 20, Line 31:   After "step" delete "described in claim 13".

Column 22, Line 8:    After "identifying" delete "in".

Column 22, Line 57:   "lob" should be -- job --.

Signed and Sealed this

Nineteenth Day of September, 2006

JON W. DUDAS
*Director of the United States Patent and Trademark Office*